United States Patent [19]

Cole

[11] Patent Number: 4,599,994

[45] Date of Patent: Jul. 15, 1986

[54] THERMOSIPHON SOLAR WATER HEATER HAVING FREEZE RUPTURE PROTECTION

[76] Inventor: S. Warren Cole, 4816 Timberline Dr., Austin, Tex. 78746

[21] Appl. No.: 485,246

[22] Filed: Apr. 15, 1983

[51] Int. Cl.[4] ................................................. F24J 2/44
[52] U.S. Cl. ................................... 126/420; 126/434; 126/437; 126/452
[58] Field of Search ............... 126/420, 434, 437, 418, 126/422, 433; 137/59, 60; 165/104.19, 104.19 A

[56] References Cited

U.S. PATENT DOCUMENTS

| | | | |
|---|---|---|---|
| 1,849,266 | 3/1932 | Bentz | 126/434 X |
| 2,311,579 | 2/1943 | Scott | 126/434 |
| 4,165,735 | 8/1979 | Smith | 126/434 X |
| 4,409,962 | 10/1983 | Riley | 126/437 |

FOREIGN PATENT DOCUMENTS 21676 10/1963 Japan ................................. 126/434

Primary Examiner—Larry Jones
Assistant Examiner—Allen J. Flanigan
Attorney, Agent, or Firm—Arnold, White & Durkee

[57] ABSTRACT

A thermosiphon solar water heating system includes a solar energy collector coupled to an elevated heated water storage tank. Water at about 4° C. is produced and used to displace colder, less dense water in the solar collector, thereby establishing circulation through the system which controls freezing and prevents rupturing. Denser water is produced by mixing cold water of less than 4° C. rising from the solar collector with warmer water greater than 4° C. in the storage tank. The denser water is directed by gravity to the solar collector.

8 Claims, 5 Drawing Figures

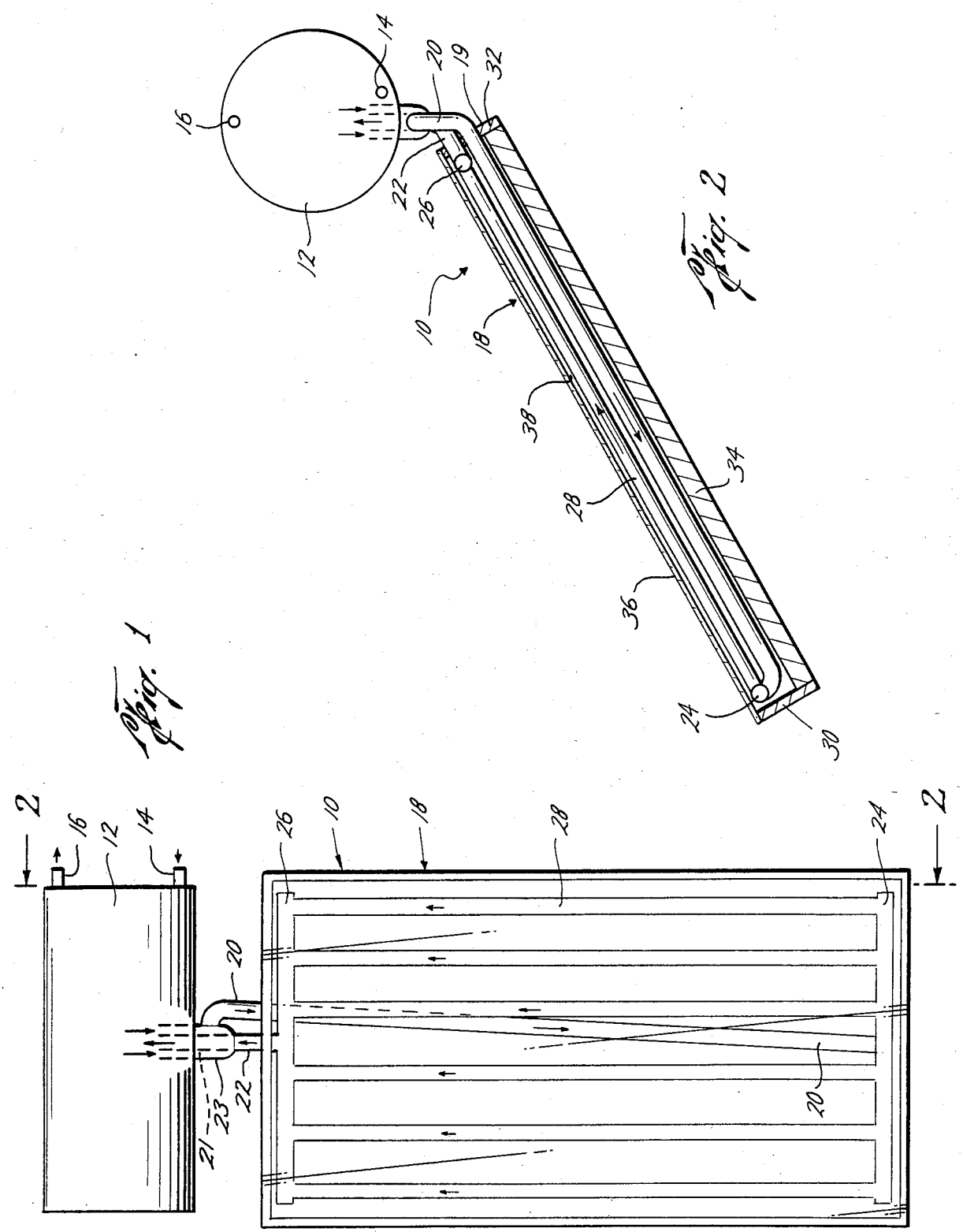

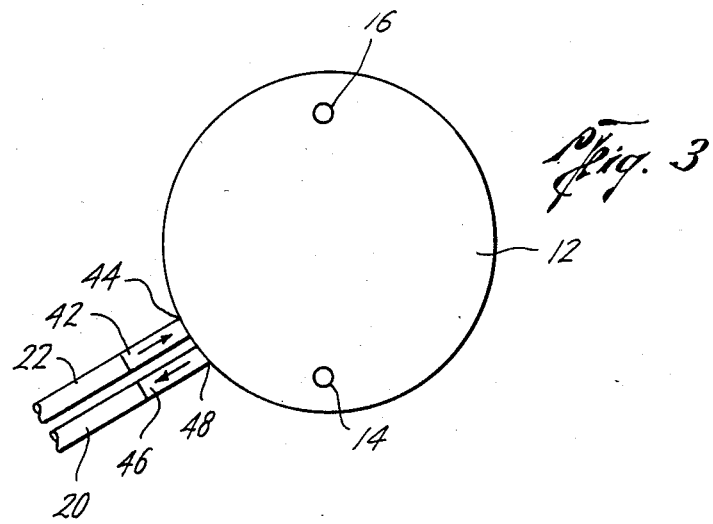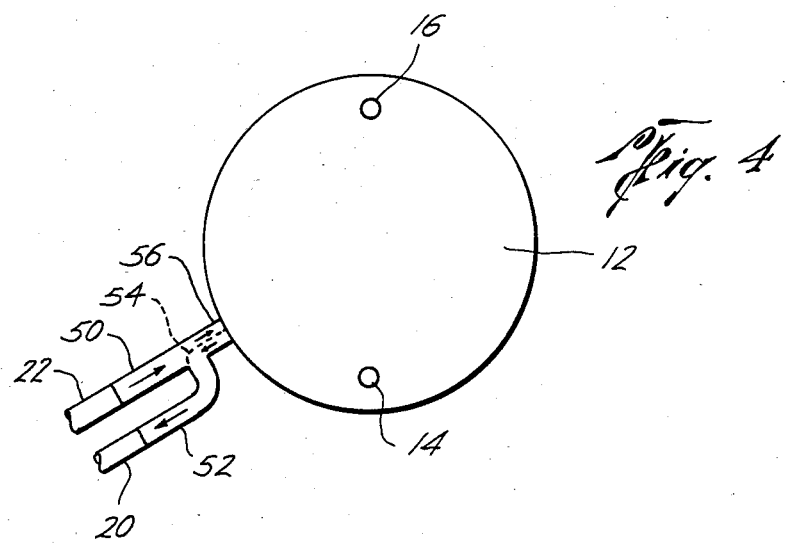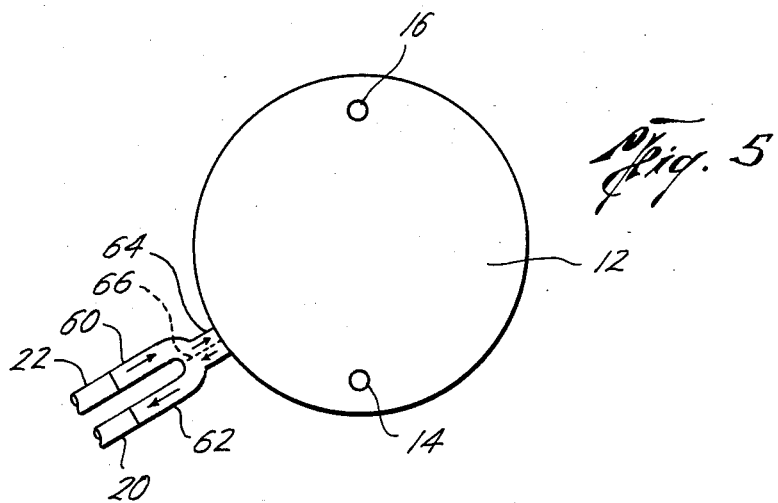

THERMOSIPHON SOLAR WATER HEATER HAVING FREEZE RUPTURE PROTECTION

BACKGROUND OF THE INVENTION

The present invention relates to solar water heating systems; and more particularly, it relates to freeze protection for thermosiphon solar water heating systems.

There are fundamentally two types of solar water heating systems. One type is a forced circulation system that utilizes a pump to move water between the water storage tank and the solar energy collector. The other type operates by natural circulation provided by thermosiphon action. In a thermosiphon solar water heating system, a solar energy collector is coupled by colder water inlet and heated water outlet pipes to a heated water storage tank disposed near by and at a higher elevation. Water heating in the solar energy collector expands; and as it does so, it becomes more buoyant. The heated water naturally rises from the solar collector into the storage tank, and is replaced by colder water from the tank.

Thermosiphon solar water heating systems are, however, subject to freeze rupture damage upon being exposed to cold weather at times when there is little solar energy, such as at night or on cloudy days. Accordingly, thermosiphon systems have largely been limited to mild climate areas. When thermosiphon systems have been installed for use in areas where there is risk of freeze damage, freeze rupture protection has been provided by draining the system, by forcing water to circulate through the system using an auxiliary pump, by heating the system with an auxiliary heater device, or by flushing the system with fresh warm water that is subsequently discarded.

SUMMARY OF THE INVENTION

The present invention provides freeze rupture protection in a thermosiphon solar water heating system. Furthermore, the present invention accomplishes this result without use of auxiliary equipment.

In accordance with the present invention, a thermosiphon flow of water is established through the system so that freezing of the water in the system takes place without trapping liquid water between ice formations. This is accomplished by use of thermosiphon flow under freezing conditions to cause the liquid water in the system to freeze in an orderly manner from the lower end of the system.

Thermosiphon flow is established by continuously producing water denser than that in the solar collector and directing it by gravity to displace water in the collector. Denser water is produced by mixing water rising from the solar collector with water in the storage tank. Central to this manner of establishing thermosiphon flow in the system is the fact that, although water freezes at 0° C. (32° F.), water is more dense at about 4° C. (39° F.). Thus, the mixing that takes place is between water colder than 4° C. from the solar collector with water warmer than 4° C. in the heated water storage tank.

A thermosiphon solar water heating system in accordance with the present invention includes a solar energy collector and a heated water storage tank disposed adjacent and elevated above. The system further includes means for mixing water rising from the solar energy collector with water in the heated water storage tank to produce water more dense than that in the solar energy collector, and means for supplying the denser water to the solar energy collector.

In a preferred embodiment, a water supply conduit is provided to convey water to the solar energy collector, and a water return conduit is provided to convey water rising out of the solar energy collector.

Further in accordance with the present invention, mixing of water from the solar energy collector with water in the heated storage tank is by an inlet conduit coupled to the water return conduit and in communication with the interior of the storage tank at an entry location on the underside thereof. Water rising in the water return conduit is thereby brought into contact with water in the storage tank for mixing.

Denser water produced by mixing of water from the solar energy collector with water in the heated storage tank is suitably directed into the water supply conduit by a funnel structure circumscribing the inlet conduit to the storage tank, and opening to the interior of the tank. The funnel structure may be but does not necessarily have to be of a conical shape.

Although mixing of water in the storage tank with that rising from the solar energy collector is suitably carried out using the inlet conduit and circumscribing funnel structure, other structures may suitably be used. For example, an inlet conduit segment coupled to the water return conduit and communicating with the interior of the storage tank at an entry location on the side thereof may be used to deliver water rising in the water return conduit into contact with water in the storage tank. An outlet conduit segment coupled to the water supply conduit and communicating with the interior of the storage tank at an exit location adjacent and at an elevation lower than the entry point location of the inlet conduit segment is also provided. In this arrangement, denser water forming proximate the entry location to the tank falls under gravity and is funneled by the outlet conduit segment into the water supply conduit.

Accordingly, the essence of the invention concerns the establishment of a thermosiphon flow of water by producing water denser than that in the solar collector and directing it to displace water in the solar collector. Further, by reason of this flow of water, freezing of water in the solar collector and other exposed elements of the water heater system is controlled so as to prevent rupturing of these elements. Yet further, the denser water is produced by mixing water in the storage tank with water rising from the solar collector. The manner of mixing is not of critical importance; it is only necessary that the water from the solar collector be brought into contact with the water in the tank, and the denser water be directed by gravity into the water supply line to the solar collector.

BRIEF DESCRIPTION OF THE DRAWINGS

A written description setting forth the best mode presently known for carrying out the present invention, and of the manner of implementing and using it, is provided by the following detailed description of illustrative embodiments which are shown in the attached drawing, wherein:

FIG. 1 is a frontal view diagram of a thermosiphon solar water heating system having freeze rupture protection in accordance with the present invention wherein mixing of water in the storage tank with water rising from the solar collector to produce denser water and funneling of the denser water produced thereby into the water supply conduit is by an inlet conduit to the tank and a circumscribing funnel structure;

FIG. 2 is a side view diagram of the system shown in FIG. 1; and

FIGS. 3, 4 and 5 show alternate structures for providing denser water to the solar collector.

DETAILED DESCRIPTION OF ILLUSTRATED EMBODIMENTS

Referring now to the drawing figures, there is shown in FIG. 1 and FIG. 2 an embodiment of a thermosiphon solar water heater system in accordance with the present invention. The system 10 includes a heated water storage tank 12 having with a cold water inlet 14 and a hot water outlet 16. Additionally, the system includes a solar energy collector 18. A water supply conduit 20 and a water return conduit 22 convey water moving into and out of the solar collector.

The system further includes means for mixing water conveyed in the water return conduit with heated water in the storage tank to produce water more dense than that in the solar energy collector. Additionally, means is provided for funneling the denser water into the water supply conduit.

In the embodiment shown in FIG. 1 and FIG. 2, the mixing means comprises an inlet conduit segment 21 coupled to the water return conduit and communicating with the interior of the storage tank at an entry location on the underside thereof. Conduit 21 delivers water moving in the water return conduit into contact with water in the storage tank. The funneling means comprises a funnel structure 23 circumscribing inlet conduit segment 21 and opening to the interior of the storage tank. Funnel structure 23 collects the denser water and directs it into the water supply conduit 20 under gravity flow.

Included within solar energy collector 18 is a channel for conveying water there through. In the embodiment shown, the channel comprises a lower manifold 24 and an upper manifold 26. A plurality of riser pipes 28 extend between the upper and lower manifolds. As shown, water supply conduit 20 couples into lower manifold 24, and water return conduit 22 couples to upper manifold 26.

Additional design features of the solar energy collector are shown in FIG. 2. Generally, the collector 18 preferably comprises a sheet-metal box structure generally indicated by reference numeral 19. Inside the box are insulating end panels 30 and 32, back panel 34, and side panels (not shown). A glass cover 36 overlays the front and defines an air space 38 within.

The objective of the apparatus is to control the freezing of water in the solar collector and other elements of the system which are exposed to cold weather at times when little or no solar energy is available. By controlling the freezing of water in the system from one part to another, such that liquid water is not trapped between ice formations, rupture or damage to system elements is obviated. This result occurs because freezing in the system occurs in an orderly manner from the lower end of the system such that the liquid water in the system is always ahead of the forming ice.

The controlled freezing in the system is accomplished by establishment of a small thermosiphon flow of water from the storage tank 12 to solar collector 18 and back to the storage tank. The thermosiphon flow of water is established by producing water denser than that in the solar collector, which denser water is used to displace water in the solar collector. The denser water directed by gravity provides a force that produces water circulation through the system. Due to the water circulation occurring under freezing conditons, ice formation in the system begins on the walls of the conduits at the lower end of the system. The circulation in the system causes the ice to be thicker at the lower end of the system such that as ice formation proceeds, the liquid water in the system is ahead of the forming ice. Since no liquid water is trapped between ice formations, damage to the system due to the expanding of liquid water freezing between ice formations is avoided.

The method relies upon the fact that water at 0° C. (its freezing point) has a density of 0.99987 grams per milliliter compared to its maximum density of 1.00000 grams per milliliter at 3.98° C. Water also is less dense at higher temperatures. Accordingly, by producing water at about 4° C. (39° F.), water colder than 4° C. in the solar collector can be displaced and thereby circulated to produce a blend of water at about 4° C. The blend of water, although preferably at 4° C. which provides maximum density, may be within the range of about 2° C. to 6° C. That is, a blend of water at a temperature within this range is sufficient to establish a thermosiphon flow circulation of water through the system in accordance with the present invention.

As has been discussed, the blending of water is suitably achieved by the structure shown in FIG. 1 and FIG. 2. However, any source of water at a temperature within the prescribed range could be utilized. Also, other structures for blending water from the solar collector with water in the storage tank could be utilized. In this regard, it is to be noted that although the conduit connections to the storage tank do not have to be circumscribing, it is important that the entry locations of the conduits to the storage tanks should be quite close.

Shown in FIG. 3 is an alternate structure for blending water to produce the required denser water. As shown, an inlet conduit segment 42 is coupled to the water return conduit 22 and communicates with the interior of the storage tank 12 at a first location 44 on the side thereof. This serves to deliver water moving in the water return conduit into contact with water in the storage tank. Further included in this arrangement is an outlet conduit segment 46 coupled to the water supply conduit 20 and in communication with the interior of the storage tank at a second location 48 on the side thereof, which is adjacent to and below the first location 44. Water at approximately 4° C. falls under the influence of gravity and is collected in outlet conduit 46, which in turn directs it into water supply conduit 20.

Shown in FIG. 4 is yet another alternate structure for blending water produced to require denser water. In this arrangement, an inlet conduit segment 50 is coupled to the water return conduit 22 and communicates with the interior of storage tank 12. Connected to the conduit segment 50 in a "T" configuration is an outlet conduit segment 52 which further couples to water supply conduit 20. Internally of the "T" fitting formed by conduit segments 50 and 52 is a baffle divider 54. The baffle divider serves to divide leg 56 of the "T" fitting into separate fluid passages. Water flowing in return conduit 22 is directed through the upper portion of leg 56 and delivered into contact with water in the storage tank. Water at approximately 4° C. falls under the influence of gravity and is collected in the lower portion of leg 56, which in turn directs the water into conduit segment 52.

Further shown in FIG. 5. is yet another alternate structure for blending water to produce the required denser water. In this arrangement, an inlet conduit segment 60 is coupled to the water return conduit 22. Connected to the conduit segment 60, to form a "U" configuration, is an outlet conduit segment 62 which further couples to water supply conduit 20. Connected to the U-shaped fitting is conduit segment 64. It enters tank 12 on the side thereof and establishes communication with the interior of the tank. Internally of conduit segment 64 is a baffle divider 66. The baffle divider serves to divide segment 64 and the "U" fitting into separate fluid passages. Water flowing in return conduit 22 is directed through inlet conduit 60 to the upper portion of segment 64 and delivered into contact with water in the storage tank. Water at approximately 4° C. falls under the influence of gravity and is collected in the lower portion of segment 64, which in turn directs it into outlet conduit segment 62.

It will be appreciated that the motive force available by the denser water falling under gravity is small. Accordingly, the manifolds and riser pipes in the solar collector must be provided with a relatively large diameter and be kept relatively short in length. Preferably, the manifold and riser pipes in the solar collector comprise copper pipes. Also, the vertical riser pipes should have absorber fins attached for collecting solar energy and converting that energy to heat energy which is absorbed by water passing therethrough. Preferably the upper and lower manifolds each have a cross sectional area at least 1.5 times that of each of the riser pipes. In a typical, practical embodiment of the solar collector 18, the riser pipes would be cylindrical and have an inside diameter of $\frac{5}{8}$ inch to 1 inch.

An additional feature of the solar collector is that the air in air space 38 tends to be colder at the bottom than at the top. This is because air in contact with cover 36 loses heat and, as it does, so, it becomes more dense and falls to the bottom of the collector. Accordingly, freezing starts at the lower manifold at points removed from the water supply conduit coupling thereto and proceeds along the manifold toward the location of the inter connection of the water supply conduit and upward along the vertical riser pipes toward the upper manifold. Circulation of water through the solar collector in accordance with the teachings of the present invention causes the freezing to proceed very slowly and continuously so that it does not trap liquid water between freeze points.

In order to sustain circulation through the solar collector and the other system components, there must be a source of water at about 4° C. As discussed, this is suitably provided by mixing in appropriate proportions colder water in the solar collector with warmer water in the storage tank.

A solar water heating system of the configuration shown in FIGS. 1 and 2 has been tested in a frozen food plant at −19° C. (−2° F.). After multiple freezing and thawing cycles including one freeze test for 58 continuous hours, the system did not rupture or show any signs of damage, even though the solar collector was completely filled with ice after about 18 hours. This was accomplished naturally, without resorting to an external source of energy, and without valves, pumps, or other auxiliary controls.

The foregoing description of the invention has been directed to particular preferred embodiments for purposes of explanation and illustration. It will be apparent, however, to those skilled in this art that many modifications and changes may be made without departing from the essence of the invention. It is the applicant's intention in the following claims to cover all equivalent modifications and variations as fall within the scope of the invention.

What is claimed is:

1. A thermosiphon solar water heating system having freeze rupture protection, comprising:
    a solar energy collector having a channel for conveying water therethrough;
    a heated water storage tank disposed adjacent and elevated above the solar collector;
    a water supply conduit, for conveying water moving by gravity to the solar collector;
    a water return conduit for conveying water rising out of the solar energy collector;
    an inlet conduit segment coupled to the water return conduit and communicating with the interior of the storage tank at an entry location on the underside thereof to deliver water moving in the water return conduit into contact with water at the lower portion of the storage tank, for mixing water conveyed in the water return conduit with heated water in the storage tank to produce water more dense than that in the solar energy collector during periods when insufficient solar energy exists for the collector to generate heat and the ambient air temperature causes water in the collector to be lowered in temperature below approximately 4° C.; and
    a funnel circumscribing the inlet conduit segment and opening to the interior of the storage tank to collect the denser water and direct it into the water supply conduit to establish water circulation through the solar energy collector.

2. The system of claim 1 wherein the channel in the solar energy collector comprises:
    an upper manifold;
    a lower manifold; and
    a plurality of riser pipes extending between the upper and lower manifolds.

3. The system of claim 2 wherein the water supply conduit couples to the lower manifold, and wherein the water return conduit couples to the upper manifold.

4. The system of claim 2 wherein the upper and lower manifolds each have a cross sectional area at least 1.5 times that of each of the riser pipes.

5. A thermosiphon solar water heating system having passive protection against freeze rupture during periods when insufficient solar energy exists for the system to generate heating and ambient air temperature conditions drop to the freezing point of water, comprising;
    a solar energy collector for generating heat including a cover for exposure to solar energy and ambient air, a water supply conduit displaced from the cover, and a riser conduit coupled to the water supply conduit and having an outlet;
    said riser conduit disposed between the the cover and the water supply conduit so as to be in closer proximity to the cover than the water supply conduit;
    said riser conduit transfering heat to the water contained therein during periods when sufficient solar energy exists for the collector to generate heat, to cause water therein to become more buoyant than water in the supply conduit;
    said riser conduit cooling the water contained therein more rapidly than the supply conduit cools the water contained in it during periods when insufficient solar energy exists for the collector to generate heat, and allowing the ambient temperature to cause water contained therein to be lowered in temperature to under 4° C. and become more buoyant than water in the supply conduit;

said riser conduit discharging at its outlet water more buoyant than water in the supply conduit; and a heated water storage tank disposed adjacent and elevated above the solar collector;

means coupled to the outlet of the riser conduit and to the water supply conduit
  (a) for delivering water discharged from the riser conduit into contact with water at the lower portion of the storage tank, to produce a quantity of water at a temperature in the range of 2° C. to 6° C. and more dense than water in the riser conduit during periods when insufficient solar energy exists for the collector to generate heat and the ambient temperature causes water in the riser conduit to be lowered in temperature under 4° C., and
  (b) for directing the denser water into the supply conduit, to establish circulation through the riser and supply conduits.

6. A thermosiphon solar water heating system having freeze rupture protection, comprising:

a solar energy collector having a channel for conveying water therethrough;

a heated water storage tank disposed adjacent and elevated above the solar collector;

a water supply conduit, for conveying water to the solar energy collector;

a water return conduit for conveying water rising out of the solar energy collector;

an inlet conduit segment coupled to the water return conduit opening to the interior of the storage tank at a first location on the underside thereof for delivering water moving in the water return conduit into contact with water in the lower portion of the storage tank for mixing water conveyed in the water return pipe with heated water in the storage tank to produce water more dense than that in the solar collector during periods when insufficient solar energy exists for the collector to generate heating and the ambient air temperature lowers to the freezing point of water; and an outlet conduit segment coupled to the water supply conduit opening to the interior of the storage tank at a second location on the underside thereof adjacent to and below the first location, for collecting the denser water and directing it into the water supply conduit to establish water circulation through the solar energy collector.

7. A thermosiphon solar water heating system having freeze rupture protection, comprising:

a solar energy collector having a channel for conveying water therethrough;

a heated water storage tank disposed adjacent and elevated above the solar collector;

a water supply conduit, for conveying water moving by gravity to the solar energy collector;

a water return conduit for conveying water rising out of the solar energy collector;

an inlet conduit segment coupled to the water return conduit and communicating with the interior of the storage tank;

an outlet conduit segment connected to the inlet conduit segment in a "T" configuration and coupled to the water supply conduit; and a baffle divider internally of the "T" configuration formed by the inlet conduit segment and the outlet conduit segment, for dividing the portion of the inlet conduit segment between the storage tank and the "T" configuration into separate fluid passages such that one fluid passage directs water from the storage tank to the outlet conduit and the other directs water from the water return conduit into the storage tank.

8. A thermosiphon solar water heating system having freeze rupture protection, comprising;

a solar energy collector having a channel for conveying water therethrough;

a heated water storage tank disposed adjacent and elevated above the solar collector;

a water supply conduit, for conveying water rising by gravity to the solar energy collector;

a water return conduit for conveying water moving out of the solar energy collector;

an inlet conduit segment coupled to the water return conduit;

an outlet conduit segment of a "U" configuration connected to the inlet conduit segment and coupled to the water supply conduit;

a coupling conduit segment connected to the "U" configured outlet conduit segment and in communication with the interior of the storage tank at a location on the underside thereof; and a baffle divider for dividing the coupling conduit segment into separate fluid passages such that one fluid passage directs water from the storage tank to the outlet conduit and the other directs water from the water return conduit into the storage tank.

* * * * *